United States Patent Office 2,916,498
Patented Dec. 8, 1959

2,916,498

3-ARYL-3-ALKYL-2-PYRROLIDONES

August Hans Lutz and Otto Schnider, Basel, Switzerland, assignors to Hoffmann-La Roche Inc., Nutley, N.J., a corporation of New Jersey No Drawing. Application June 11, 1957
Serial No. 664,896

Claims priority, application Switzerland July 25, 1956

1 Claim. (Cl. 260—326.5)

This invention relates to 3-aryl-3-lower alkyl-2-pyrrolidones. The aryl groups include phenyl and lower alkylphenyl, in particular, methyl substituted phenyl, i.e. 4-methylphenyl and 3,4-dimethylphenyl. The lower alkyl groups include methyl, ethyl, n-propyl, isopropyl, butyl, etc. A particularly preferred group constitutes those compounds wherein the aryl group is phenyl and the lower alkyl group is methyl, ethyl, n-propyl or isopropyl.

The compounds of this invention are produced by converting an aryl-alkyl-acetonitrile into the alkali metal salt, e.g. the sodium salt, and treating the salt with ethylene oxide, preferably in an inert solvent, to obtain α-aryl-α-alkyl-γ-hydroxy-butyronitrile. The last named nitrile is cyclized with acid to obtain 2-imino-3-aryl-3-alkyl-tetrahydrofuran which is hydrolyzed, without isolation from the reaction mixture, with heat to produce α-aryl-α-alkyl-γ-hydroxy-butyrolactone. The lactone is converted to 3-aryl-3-alkyl-2-pyrrolidone by treatment with ammonia in an autoclave at 180° to 200° C. The aryl and alkyl groups on the starting material are the same as defined above. They are retained throughout the synthesis and appear as the substituents in the 3-position.

The novel compounds are useful as hypnotics. Members of the group are also useful as anticonvulsants. They may be administered orally, for example in the form of tablets, according to conventional procedure.

The following examples are illustrative of the invention. All temperatures are in degrees centigrade.

*Example 1*

145 g. of phenyl-ethyl-acetonitrile were mixed with 39 g. of finely pulverized sodamide in a 2-liter flask equipped with stirrer, reflux condenser, dropping funnel and thermometer. The mixture began to boil with strong evolution of ammonia. After the conclusion of the reaction, the mixture was refluxed for 15 minutes and most of the ammonia was eliminated by passing through nitrogen.

The ether soluble sodium salt of phenyl-ethyl-acetonitrile thus obtained was converted with an ether solution of 45 g. of ethylene oxide with the evolution of heat to α-phenyl-α-ethyl-γ-hydroxy-butyronitrile which was obtained after ½ hour reflux. The contents of the flask were cooled, treated with ice and water, the ether phase was dried over sodium sulfate and after concentrating the solvent was distilled under water vacuum. The boiling point of the colorless oil thus obtained was 174°–175°/13 mm.

189.2 g. of α-phenyl-α-ethly-γ-hydroxy-butyronitrile were added with vigorous agitation to 500 ml. of 15% hydrochloric acid solution, cooled to −10°. After stirring for 5 minutes, 200 ml. of ice water and 200 ml. of ether were added. The aqueous phase was separated and made alkaline to litmus with 20% ammonia in the presence of ice. An oil precipitated which was extracted with ether, dried and distilled. Under a pressure of 14 mm. and at a temperature between 154°–158°, 120 g. of a clear, colorless oil distilled over. The 2-imino-3-phenyl-3-ethyl-tetrahydrofuran thus obtained is soluble in acids in the cold but after a short time α-phenyl-α-ethyl-γ-hydroxy-butyrolactone precipitates from the aqueous acid solution as a colorless oil. By heating to 90°, the precipitation is completed.

100 g. of 2-imino-3-phenyl-3-ethyl-tetrahydrofuran were added, with stirring, to 300 ml. of 3 N sulfuric acid heated to 90°. The material originally passed into solution but after a short time α-phenyl-α-ethyl-γ-hydroxy-butyrolactone precipitated. The last named compound was extracted with methylenechloride, dried over sodium sulfate and distilled at 168° to 168.5°/13 mm.

190 g. of α-phenyl-α-ethyl-γ-hydroxy-butyrolactone were dissolved in 300 ml. of methanol and treated with 200 g. of 100% ammonia in an autoclave at 180° to 200°. The 3-phenyl-3-ethyl-2-pyrrolidone thus obtained was evaporated to dryness and crystallized from methanol-water, M.P. 86° to 87°.

*Example 2*

189.2 g. of α-phenyl-α-ethyl-γ-hydroxy-butyronitrile, obtained as described in Example 1, were added with stirring to 400 ml. of 15% hydrochloric acid and heated to 90°. The material first went into solution, but then α-phenyl-α-ethyl-γ-hydroxy-butyrolactone precipitated in oily drops. The lactone was extracted with ether, dried over sodium sulfate and distilled under water vacuum. The α-phenyl-α-ethyl-γ-hydroxy-butyrolactone distilled between 168° to 168.5° at 13 mm. pressure. By treating the product according to the procedure described in Example 1, there was obtained 3-phenyl-3-ethyl-2-pyrrolidone.

*Example 3*

α-phenyl-α-methyl-γ-hydroxy-butyronitrile, B.P. 161° to 168°/10 mm., was obtained from phenyl-methyl-acetonitrile by the procedure described in Example 1. The nitrile was converted to α-phenyl-α-methyl-γ-hydroxy-butyrolactone, B.P. 160° to 165°/10 mm., by heating with hydrochloric acid. The lactone was heated with ammonia in an autoclave to obtain 3-phenyl-3-methyl-2-pyrrolidone, M.P. 79.5°, B.P. 198° to 200°/11 mm.

*Example 4*

By following the procedure described in Example 1, phenyl-n-propyl-acetonitrile was converted to α-phenyl-α-n-propyl-γ-hydroxy-butyronitrile, B.P. 176°/10 mm., which in turn was converted to α-phenyl-α-n-propyl-γ-hydroxy-butyrolactone, B.P. 172° to 179°/12 mm., and then to 3-phenyl-3-n-propyl-2-pyrrolidone, M.P. 78.5°, B.P. 208° to 209°/11 mm.

*Example 5*

By following the procedure described in Example 1, phenyl-isopropyl-acetonitrile was converted to α-phenyl-α-isopropyl-γ-hydroxy-butyronitrile, B.P. 173° to 178°/10 mm., which in turn was converted to α-phenyl-α-isopropyl-γ-hydroxy-butyrolactone, B.P. 170° to 176°/12 mm., and then to 3-phenyl-3-isopropyl-2-pyrrolidone, M.P. 114°.

*Example 6*

78 g. of finely pulverized sodamide were covered with about 200 ml. of dry ether, treated with a solution of 262 g. of 4-methyl-benzyl-cyanide in 500 ml. of ether and refluxed for ½ hour. The evolved ammonia was removed with a stream of dry nitrogen. The resulting dark solution was treated with 255 g. of isopropyl bromide, refluxed for ½ hour and treated with ice water. The ether phase was separated and the solvent was distilled off. The residual isopropyl-(4-methylphenyl)-acetonitrile was obtained as a colorless oil, B.P. 129° to 132°/12 mm.

39 g. of sodamide were suspended in about 500 ml. of dry ether, treated with 173 g. of isopropyl-(4-methylphenyl)-acetonitrile, refluxed for ½ hour and the evolved ammonia was removed with a stream of dry nitrogen. The solution was cooled and treated with 47 g. of ethylene oxide. After treating with water, the ether phase was distilled under water vacuum. The α-isopropyl-α-(4-methylphenyl)-γ-hydroxy-butyronitrile thus obtained boiled between 200° to 210° at a pressure of 14 mm.

The hydrochloride of 2-imino-3-(p-methylphenyl)-3-isopropyltetrahydrofuran was obtained in good yield by treating the ether solution of α-isopropyl-α-(4-methylphenyl)-γ-hydroxy-butyronitrile with hydrogen chloride gas. The amine was washed with water. By heating the aqueous solution α-isopropyl-α-(4-methylphenyl)-γ-hydroxy-butyrolactone precipitated in almost quantitative yield.

By heating the lactone in the presence of ammonia at about 200°, preferably in an autoclave, there was obtained 3-isopropyl-3-(p-methylphenyl)-2-pyrrolidone, M.P. 127° to 128°, B.P. 220° to 223°/13 mm. (crystallized from benzene).

*Example 7*

According to the procedure described in Example 6, (3,4-dimethylphenyl)-isopropyl-acetonitrile, B.P. 150° to 152°/11 mm., was converted with sodamide and ethylene oxide to α-(3,4-dimethylphenyl)-α-isopropyl-γ-hydroxy-butyronitrile, B.P. 199° to 201°/11 mm. The last named product was cyclized with hydrochloric acid and the resulting 2-imino-3-(3',4'-dimethylphenyl)-3-isopropyltetrahydrofuran was saponified to obtain α-(3,4-dimethylphenyl)-α-isopropyl-γ-hydroxy-butyrolactone, B.P. 196° to 198°/12 mm. By treating the latter with ammonia there was obtained 3-(3',4'-dimethylphenyl)-3-isopropyl-2-pyrrolidone, M.P. 143° to 144°.

We claim:
3-phenyl-3-ethyl-2-pyrrolidone.

References Cited in the file of this patent

UNITED STATES PATENTS

| | | |
|---|---|---|
| 2,070,524 | Cramer | Feb. 9, 1937 |
| 2,105,808 | Cramer | Jan. 18, 1938 |
| 2,267,757 | Schuster et al. | Dec. 30, 1941 |
| 2,280,791 | Bruson | Apr. 28, 1942 |
| 2,379,639 | Hultquist | July 3, 1945 |
| 2,490,937 | Weston | Dec. 13, 1949 |
| 2,524,643 | Walter et al. | Oct. 3, 1950 |
| 2,553,308 | Faulkner | May 15, 1951 |
| 2,650,231 | Arnold et al. | Aug. 25, 1953 |
| 2,784,200 | Frick et al. | Mar. 5, 1957 |
| 2,792,399 | Ekenstam et al. | May 14, 1957 |

OTHER REFERENCES

Richter's Organic Chemistry, vol. 3, P. Blakiston's Son and Co. 1923, pages 3 to 4.